United States Patent
Muhamed et al.

(10) Patent No.: US 8,040,858 B2
(45) Date of Patent: Oct. 18, 2011

(54) METHOD FOR ENABLING COMMUNICATIONS BETWEEN A COMMUNICATION DEVICE AND A WIRELESS ACCESS POINT

(75) Inventors: Rias Muhamed, Austin, TX (US); Anil K. Doradla, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 555 days.

(21) Appl. No.: 11/312,119

(22) Filed: Dec. 20, 2005

(65) Prior Publication Data
US 2007/0140189 A1    Jun. 21, 2007

(51) Int. Cl.
*H04W 4/00* (2009.01)
*H04W 40/24* (2009.01)
*H04M 3/00* (2006.01)

(52) U.S. Cl. .......... 370/338; 455/419; 455/432.2; 455/448; 455/552.1

(58) Field of Classification Search .......... 455/41.2, 455/41.3, 412.1, 412.2, 434; 370/395.21
See application file for complete search history.

(56) References Cited

U.S. PATENT DOCUMENTS

| | | | |
|---|---|---|---|
| 7,522,906 B2 * | 4/2009 | Whelan et al. | 455/411 |
| 2003/0133421 A1 * | 7/2003 | Sundar et al. | 370/338 |
| 2004/0156372 A1 * | 8/2004 | Hussa | 370/401 |
| 2005/0015467 A1 | 1/2005 | Noda | |
| 2005/0157677 A1 * | 7/2005 | Dowling | 370/328 |
| 2005/0177515 A1 * | 8/2005 | Kalavade et al. | 705/52 |
| 2005/0195841 A1 * | 9/2005 | Dowling | 370/401 |
| 2006/0035636 A1 * | 2/2006 | Pirila | 455/435.2 |
| 2006/0221917 A1 * | 10/2006 | McRae | 370/338 |
| 2007/0070935 A1 * | 3/2007 | Prakash et al. | 370/328 |
| 2007/0082699 A1 * | 4/2007 | Karaoguz et al. | 455/553.1 |
| 2007/0087764 A1 * | 4/2007 | Buckley et al. | 455/466 |
| 2007/0143499 A1 * | 6/2007 | Chang | 709/245 |

* cited by examiner

*Primary Examiner* — Nick Corsaro
*Assistant Examiner* — Tangela T. Chambers
(74) *Attorney, Agent, or Firm* — Yudell Isidore Ng Russell PLLC

(57) ABSTRACT

A system and methods (300, 500) are disclosed for enabling communications between a communication device and a wireless access point. A system that incorporates teachings of the present disclosure may include, for example, a multimode communication device (MCD) (106) having a controller (214) for managing operations of a multimode wireless transceiver (202) supporting communications on a plurality of wireless access technologies (103). The controller can be programmed to transmit (324) to a network management system (NMS) (100) over a first wireless access technology a request for configuration information associated with a wireless access point, receive (326) the configuration information from the NMS, and enable (320) communications with the wireless access point over a second wireless access technology according to the configuration information. Embodiments for the NMS are also disclosed.

20 Claims, 4 Drawing Sheets

METHOD FOR ENABLING COMMUNICATIONS BETWEEN A COMMUNICATION DEVICE AND A WIRELESS ACCESS POINT

RELATED APPLICATION

U.S. patent application Ser. No. 11/296,721, filed Dec. 6, 2005, by Doradla et al., entitled "Method for Conserving Energy in a Multimode Communication Device".

FIELD OF THE DISCLOSURE

The present disclosure relates generally to communication techniques, and more specifically to a method for enabling communications between a communication device and a wireless access point.

BACKGROUND

As WiFi makes its way into cellular phones, configuring these devices can be burdensome. Basic WiFi provisioning requires a Network ID (generally referred to as the Service Set Identifier or SSID) and encryption keys to be configured properly in the phone and the access point.

In some applications, it is possible for a phone to automatically detect an SSID from a beacon signal broadcast by the access point, thereby avoiding the need to manually configure it. However, for security purposes the access point may be provisioned to disable the broadcast of the SSID, in which case the end user of the phone needs to manually configure the phone with the SSID. For secure communications, most WiFi access points today utilize 128 bit encryption keys consisting of a hexadecimal string. Entering the hexadecimal string into the phone can be a challenge for most users, and is a process that is highly prone to errors, particularly when the device only has a 12 button keypad.

A need therefore arises for a method to ease the burden of configuring a multimode communication device for communicating with a corresponding wireless access point.

DETAILED DESCRIPTION

Embodiments in accordance with the present disclosure provide a method for enabling communications between a communication device and a wireless access point.

In a first embodiment of the present disclosure, a multimode communication device (MCD) has a controller for managing operations of a multimode wireless transceiver supporting communications on a plurality of wireless access technologies. The controller can be programmed to transmit to a network management system (NMS) over a first wireless access technology a request for configuration information associated with a wireless access point, receive the configuration information from the NMS, and enable communications with the wireless access point over a second wireless access technology according to the configuration information.

In a second embodiment of the present disclosure, a network management system (NMS) has a controller for managing operations of a communications interface for exchanging messages with multimode communication devices (MCDs) capable of accessing a plurality of wireless access technologies. The controller can be programmed to receive from an MCD over a first wireless access technology a request for configuration information associated with a wireless access point, obtain the configuration information associated with the wireless access point according to the request, and transmit the configuration information to the MCD for enabling communications between the wireless access point and the MCD over a second wireless access technology.

In a third embodiment of the present disclosure, a computer-readable storage medium operates in a multimode communication device (MCD). The storage medium can have computer instructions for transmitting over a first wireless access technology a request for configuration information associated with a wireless access point from a network management system (NMS), and enabling over a second wireless access technology communications with the wireless access point according to the configuration information received from NMS.

In a fourth embodiment of the present disclosure, a computer-readable storage medium operates in a network management system. The storage medium can have computer instructions for obtaining configuration information associated with a wireless access point in response to a request received from a multimode communication device (MCD) over a first wireless access technology, and transmitting the configuration information to the MCD for enabling over a second wireless access technology communications between the MCD and the wireless access point.

Figure 1:
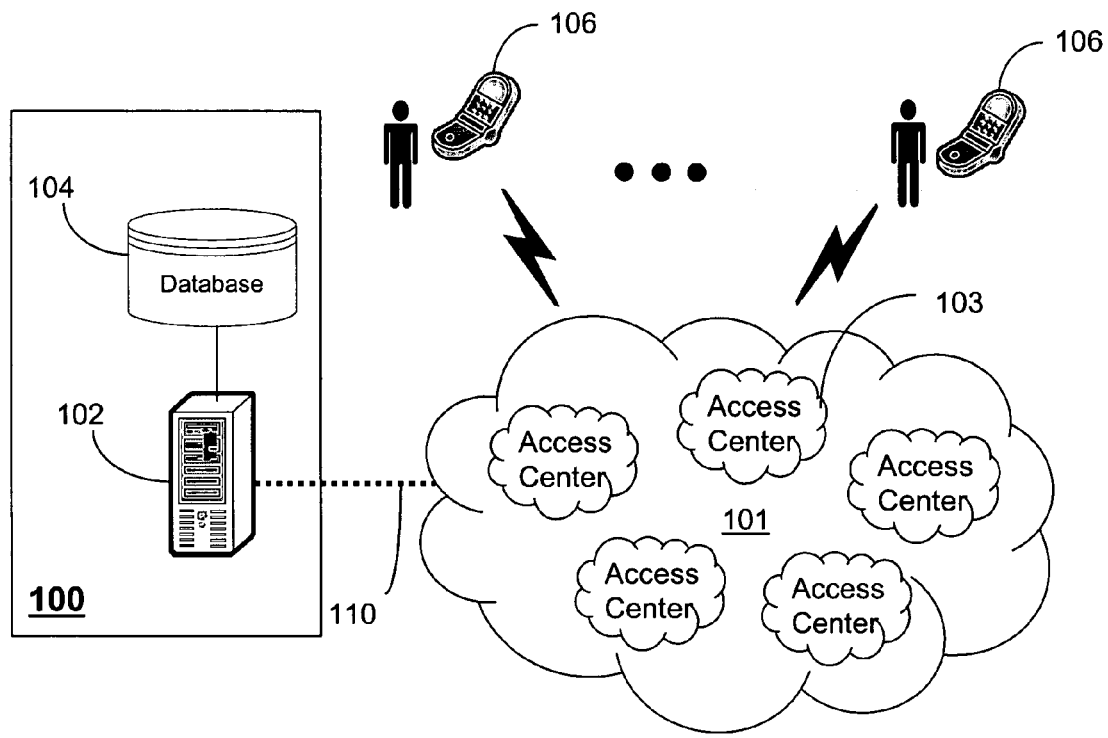
FIG. 1 is a block diagram of a network management system (NMS) and a number of multimode communication devices (MCDs) operating in a communication system according to teachings of the present disclosure.

FIG. 1 is a block diagram of a network management system (NMS) 100 and multimode communication devices (MCDs) 106 operating in a communication system 101 according to teachings of the present disclosure. The NMS 100 comprises a communications interface 110, a memory 104 and a controller 102. The communications interface 110 utilizes wired or wireless communications technology for interfacing to the communication system 101. The communications interface 110 can be represented by a circuit-switched and/or a packet-switched interface. The controller 102 can utilize computing technology such as a scalable server to manage operations of the communications interface 110 and a database embedded in the memory 104 for storing network information that includes location information, configuration information, and/or an address such as an IP (Internet Protocol) address or URL (Uniform Resource Locator) associated with one or more wireless access points operating in each of the access centers 103. The NMS 100 can also operate common applications such as a CRM (Customer Relationship Management) system for managing customer accounts stored in the database which includes among other things information relating to services rendered, a customer's residential address, and other pertinent service information.

Figure 2:
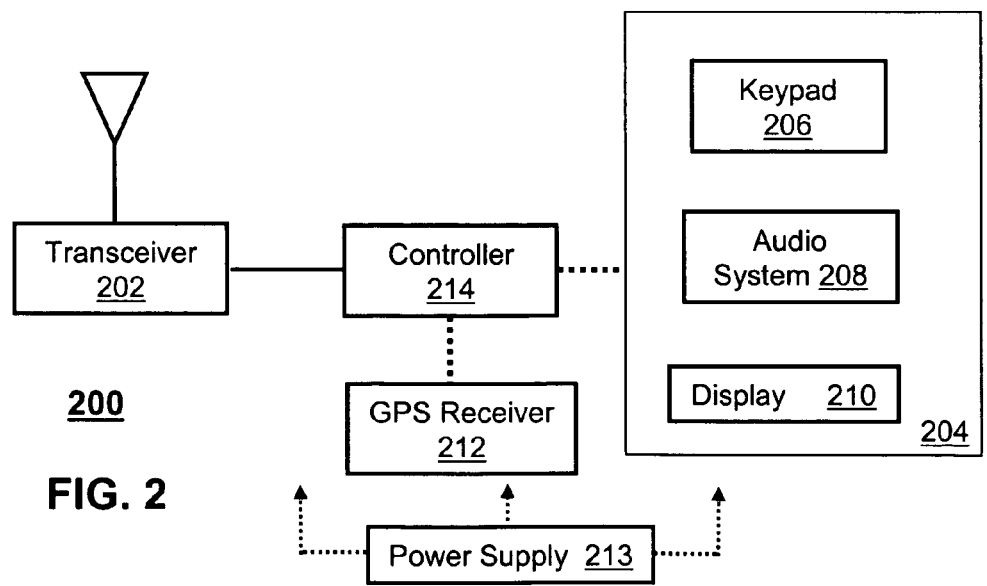
FIG. 2 is a block diagram of the MCD of FIG. 1 according to teachings of the present disclosure.

An MCD 106 is a wireless device capable of communicating with any number of wireless access technologies for data and/or voice communications. Common access technologies supported by the MCD include cellular (CDMA, GSM, TDMA, UMTS, etc.), WiFi, ultra wideband (UWB), software defined radio (SDR), Bluetooth™, and WiMax, just to mention a few. The MCD 106 can support wireless circuit-switched voice communications or packet-switched voice_ communications such as voice over IP (VoIP). FIG. 2 depicts a block diagram of the MCD 106 according to teachings of the present disclosure. The MCD 106 can comprise a multimode wireless transceiver 202 (herein referred to as a "transceiver"), and a controller 214 for controlling operations thereof. The transceiver 202 utilizes common multimode wireless technology to support end user communications by way of the access technologies described above.

In a supplemental embodiment, the MCD 106 can further include a user interface (UI) 204, and a GPS (Global Positioning System) receiver 212. The UI 204 can include among other things a keypad 206 with selectable navigation and depressible keys, an audio system 208 for conveying and intercepting audio messages from an end user, and a display 210 for conveying images. Each of these embodiments can serve as a means for manipulating selectable options provided by the MCD 106, and for conveying messages to the end user according to the present disclosure.

The GPS receiver 212 utilizes common technology for receiving signals from a constellation of satellites for detecting a location of the MCD 106. The controller 214 can include a computing device such as a microprocessor, or digital signal processor (DSP) with associated storage devices such as RAM, ROM, DRAM, Flash, and other common memories. To support mobility, the MCD 106 can include a portable power supply 213 with technology for supplying energy to the components of the MCD 106 from one or more rechargeable batteries, and for recharging said batteries.

The communication system 101 can include a number of wireless access technologies such as cellular (GSM, CDMA, UMTS, EVDO, etc.), WiFi, UWB, WiMax, Bluetooth™, SDR, among others, for communicating with the MCDs 106. For the present illustration, it will be assumed that the MCD 106 is a dual-mode device supporting GSM and WiFi access technologies. The access centers 103 represent, for example, retailers (such as Starbucks™) or residences of MCD end users. The access centers 103 are scattered throughout the communication system 101 as WiFi centers with one or more wireless access points (WAPs) at each center. These centers 103 thus provide the MCDs 106 alternate or supplementary communications means to GSM. End users of the MCDs 106 can therefore switch between access technologies when it may be convenient or cost effective to do so. As noted earlier WAPs can represent any one of the wireless access technologies discussed above. For convenience and without limiting the scope of the present disclosure, the WAPs described below are assumed to be WiFi only.

Figure 3:
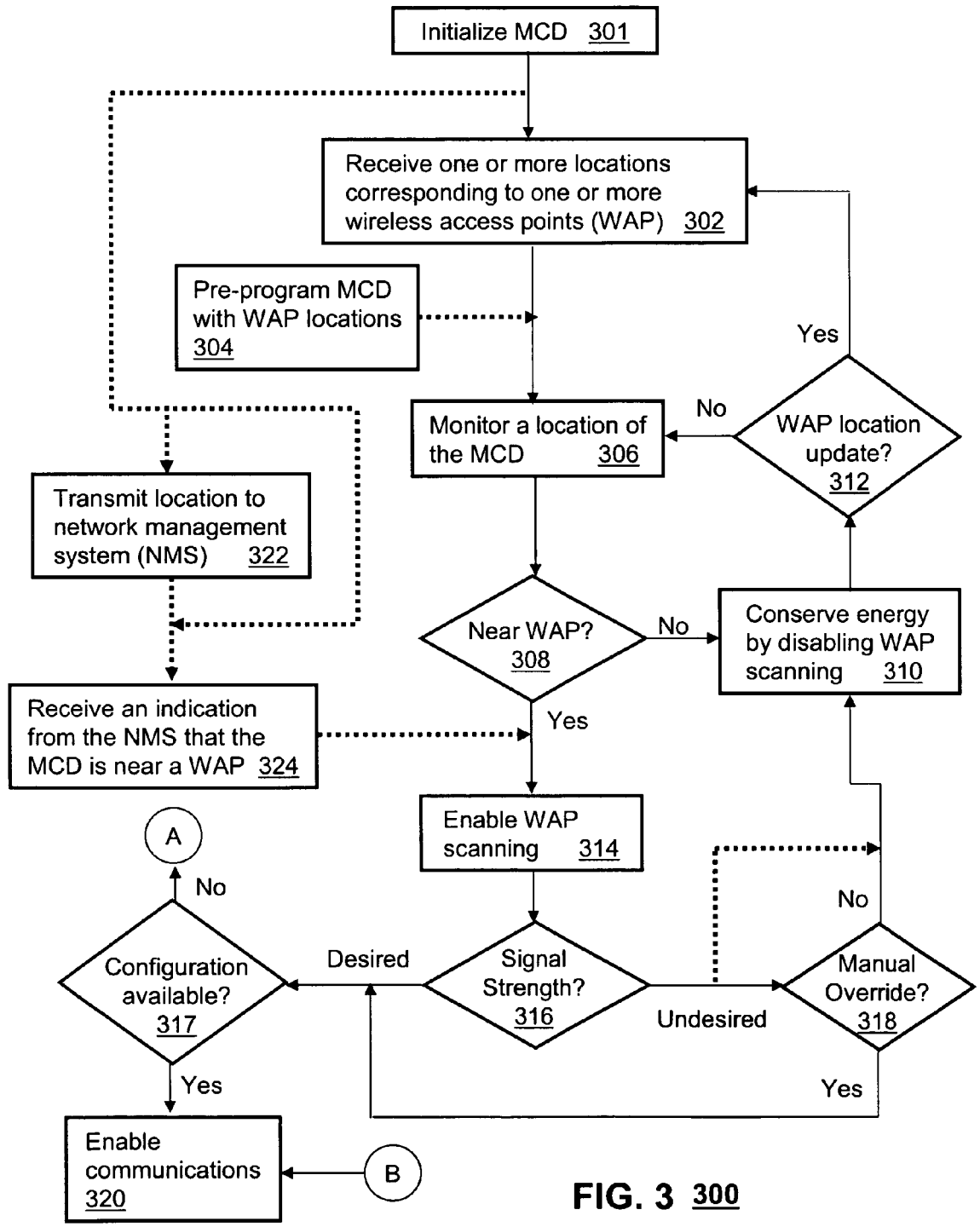
FIGS. 3-4 depict a flowchart of a method operating in the MCD according to teachings of the present disclosure.

FIG. 3 depicts a flowchart of a method 300 operating in the MCD 106 according to teachings of the present disclosure. Method 300 begins with step 301 where the controller 214 can be programmed to initialize the components of the MCD 106. The initialization step can include among other things programming the transceiver 202 by way of the controller 214 to camp primarily on the GSM network of the communication system 101, while disabling the process of scanning for one or more wireless access points (WAPs) until otherwise directed by the controller 214. As a result of the initialization step, the MCD 106 does not consume unnecessary energy when a WAP is not within the communication range of the MCD 106.

In step 302 the controller 214 can be programmed to receive one or more locations corresponding to one or more wireless access points (WAP) located at the access centers 103. This step can be accomplished by way of a wireless message received from a number of sources such as the NMS 100 (e.g., an SMS-Short Message System) over the GSM network of the communication system 101, during a WiFi session through one of the access centers 103, from a website managed by the NMS 100 while the MCD 106 is coupled to a computer for provisioning purposes, or through any other suitable means for receiving location information. Alternatively, the storage portion of the controller 214 (e.g., Flash memory) can be pre-programmed in step 304 with the WAP locations, and later updated wirelessly or by the other methods described above.

Where the MCD 106 has a location receiver such as the GPS receiver 212, the controller 214 can proceed to step 306 where it monitors the location of the MCD 106 periodically. In step 308, the controller 214 compares the monitored location to the one or more locations provided in steps 302 or 304. If the controller 214 detects the MCD 106 is near one or more of the WAP locations, it proceeds to step 314 where it enables the transceiver 202 to begin scanning for a WAP. If the signal strength detected in step 316 by the transceiver 202 (using, for example, RSSI—Receive Signal Strength Indication) is desirable, then the controller 214 proceeds to step 317 where it checks for configuration information transmitted by the WAP device.

The configuration information can include a service set identifier (SSID). If configuration information is detected, the controller 214 proceeds to step 320 where it provisions itself with the configuration information and enables communications with the WAP device. Once connected, a notification can be submitted to the end user in step 320 by way of the UI 204 indicating that a WAP device has been detected and communications are active. The notification can also show the availability of voice communications (e.g., VoIP) and/or data communications over the Internet. The end user can choose to initiate by way of the UI 204 a voice or data call as desired.

Figure 4:
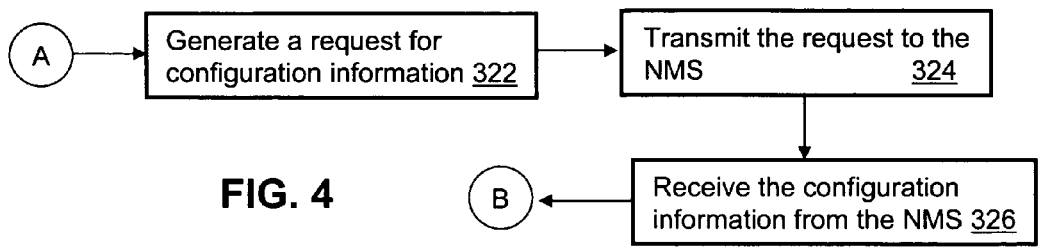

If on the other hand, the controller 214 determines in step 317 that the WAP device is not transmitting configuration information, the controller 214 can automatically proceed to step 322 of FIG. 4 or request an action by the end user to proceed. In the latter case, the controller 214 can be programmed to display a prompt in the UI 204 requesting an action from the end user. The action can be simply a prompt directing the end user to depress a soft-key by way of the keypad 206 to initiate a request for configuration information from the NMS 100. Once initiated, the controller 214 generates and transmits the request in steps 322 and 324 of FIG. 4.

The request can include an identifier associated with the MCD 106 such as an IMSI (International Mobile Subscriber Identity), a caller ID, or any other form of identification recognizable by the NMS 100. Alternatively, or in combination, the request can include a location of the MCD 106 corresponding to a time when it attempted to access the WAP device. In response to the transmitted request, the controller 214 receives from the NMS 100 the configuration information (i.e., the WAP's SSID and encryption key). In step 320 of FIG. 3, the controller 214 configures the MCD 106 with the configuration information thereby enabling communications as described earlier.

Referring back to step 308, if the controller 214 determines that the MCD 106 is not within the communication range of a WAP device, then the controller 214 proceeds to step 310 where it continues to conserve energy by disabling the process to scan for WAP devices. If the controller 214 detects in step 316 that the signal strength is undesirable, then the controller 214 proceeds to step 318 where it checks for a manual override from the end user of the MCD 106. If the end user wishes to force a scan, the controller proceeds to step 320 where it enables communications with the WAP as described above.

If the end user does not wish to force a scan, the controller 214 proceeds to step 310 to conserve energy. Alternatively, the controller 214 can also be programmed to proceed from step 316 to step 310. While in step 310, the MCD 106 remains on a GSM channel in stand-by mode waiting to receive voice or data messages. In step 312, the controller 214 can be further programmed to check for WAP location updates from the NMS 100 over the GSM network, or by way of a provisioning device such as a computer connected to the NMS 100 through the Internet or other communication means. If there are no updates, the controller 214 proceeds to step 306 to restart the monitoring process. Otherwise, it proceeds to step 302 to receive the update.

In yet another embodiment, the MCD 106 may not have been provisioned with the locations of the WAPs in the communication system 101. Under this use case, the controller 214 can be programmed to proceed from step 301 to step 322 where it transmits periodically the location of the MCD 106 to the NMS 100 as monitored by the GPS receiver 212. When the NMS 100 detects that the MCD 106 is near a WAP device, it transmits to the MCD 106 an indication of said state, which in turn is received in step 324 by the transceiver 202 as directed by the controller 214. The controller 214 then proceeds to step 314 as described above.

Alternatively, the MCD 106 may not have a GPS receiver 212. Under this embodiment, the NMS 100 can monitor the location of the MCD 106 by means such as triangulation. Accordingly, the controller 214 of the MCD 106 can be programmed to proceed from step 301 to step 324. When an indication is received from the NMS 100 that the MCD 106 is near a WAP device, the controller 214 proceeds to step 314 as described earlier.

Figure 5:
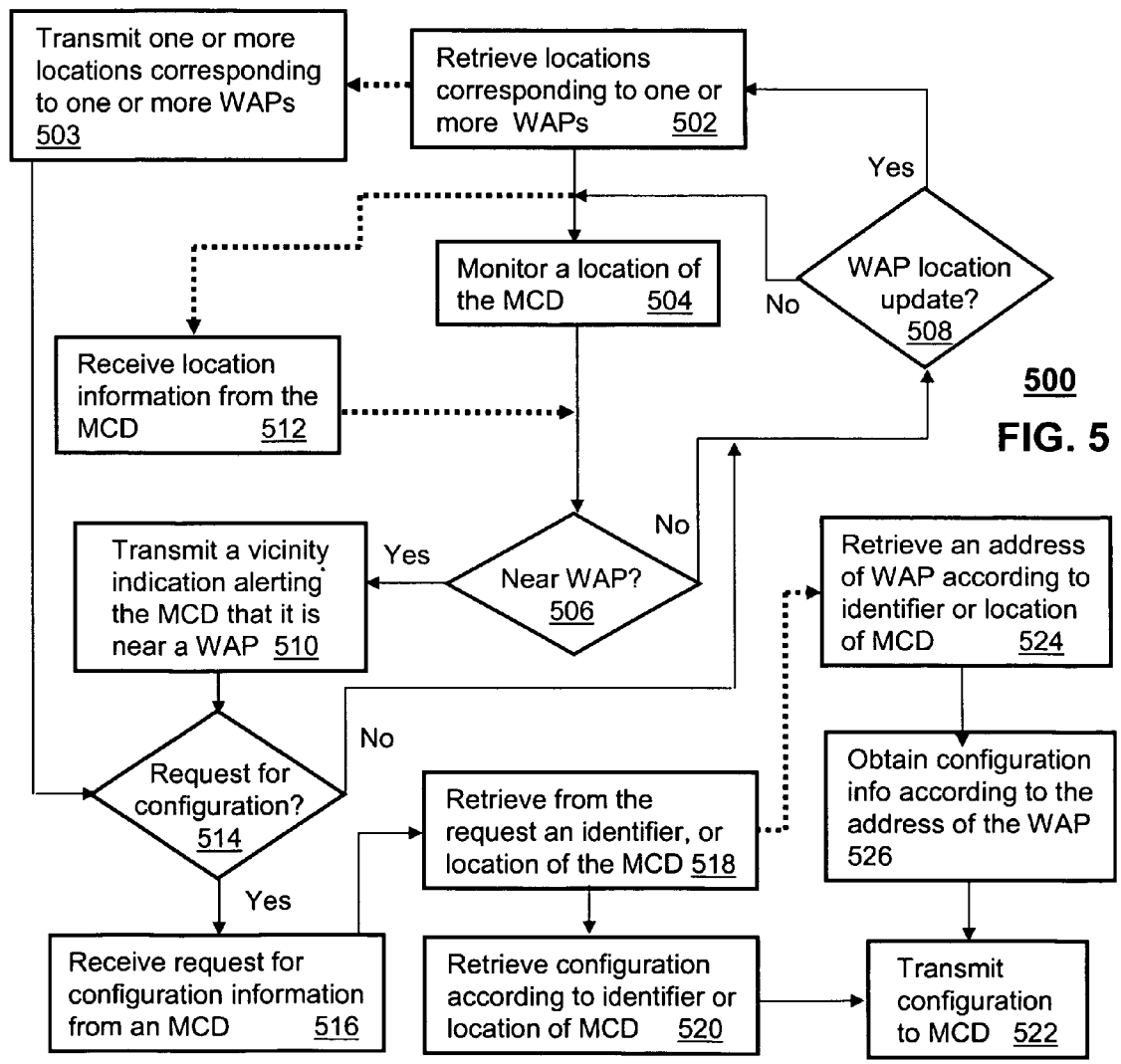
FIG. 5 depicts a flowchart of a method operating in the NMS according to teachings of the present disclosure.

FIG. 5 depicts a flowchart of a method 500 operating in the NMS 100 that mirrors some of the functions described in FIG. 3 according to teachings of the present disclosure. Method 500 begins with step 502, where the controller 102 of the NMS 100 can be programmed to search and retrieve one or more locations corresponding to one or more of the WAPs. The controller 102 can search its database 104, or another remote source that includes location information corresponding to the WAPs. In an embodiment, where the MCD 106 has a GPS receiver 212, the controller 102 of the NMS 100 can proceed to step 503 where it transmits the one or more locations of the WAPs found in step 502. From this point on, the MCD 106 performs the power conservation process described by method 300.

Alternatively, if the MCD 106 has a GPS receiver 212, but it is not provisioned with location information, the controller 102 can proceed to step 512 where it receives location information from the MCD 106. If in step 506 the controller 102 detects that the location received is near a known WAP device, then it proceeds to step 510 where it transmits a vicinity indication alerting the MCD 106 that it is near a WAP. If, on the other hand, the location given by the MCD 106 is not within the communication range of a WAP, the controller 102 proceeds to step 508 where it checks for WAP location updates. Updates can occur as the result of new or modified distributions of WAP devices associated with the access centers 103. These updates can be managed by a CRM operating in the NMS 100 or by way of another remote source coupled to the NMS 100. If there are no updates, the controller 102 proceeds to steps 504 or 512 and repeats the foregoing process. Otherwise, it proceeds to step 502 and retrieves the updated location information.

If the MCD 106 does not have a GPS receiver 212, the controller 102 can proceed from step 502 to step 504 where it monitors the location of the MCD 106 by common means such as GSM triangulation using three or more references (such as a GSM base station towers) to approximate the location of the MCD 106. When the controller 102 detects in step 506 that the MCD 106 is near one or more of the WAP devices, it proceeds to step 510 to transmit said indication. Otherwise, it proceeds to step 508 to repeat the monitoring process and/or retrieve updated WAP locations.

Once the MCD 106 has acquired the means to detect that it is near a WAP device from either of steps 503 or 510, the controller 102 proceeds to step 514 where it monitors requests transmitted by the MCD 106 for the configuration information of the WAP device. As noted earlier, if the WAP device does not transmit this information to the MCD 106 and/or the MCD 106 is not already pre-programmed with the SSID and encryption key of the WAP device, it will submit a request to the NMS 100 for this information as noted in step 324 of FIG. 4. If no request is detected, the controller 102 proceeds to step 508 where it checks for updates to the WAP locations as noted above. Otherwise, the controller 102 proceeds to step 516 where it retrieves from the request an identifier and/or location of the MCD 106.

The controller 102 can be programmed to proceed to step 520 where it retrieves from its database the configuration information of the WAP according to the identifier or the location. For WAP devices operating in a residence, a caller ID or IMSI from the identifier can be used to identify the WAP device belonging to the end user of the MCD 106. Similarly, if the MCD 106 is located in the residence, the NMS 100 can associate the location of the MCD 106 with the location of the WAP at the residence and thereby retrieve the configuration information. If on the other hand, the MCD 106 is roaming outside its residence, such as at a retail store, the location of the MCD 106 can assist the NMS 100 to cross-reference the WAP near the MCD 106, and thereby retrieve the configuration information associated with said device from its database 104.

If the NMS 100 does not have the configuration information of the WAP in it's database, the controller 102 can be programmed to proceed from step 518 to step 524 where it retrieves an address associated with the WAP according to the identifier or the location of the MCD 106. The address can include an IP address or URL with security information such as a login and/or password which can facilitate communications between the NMS 100 and the WAP. Accordingly, in step 526 the controller 102 can be programmed to obtain the configuration information from the WAP over the communication system 101. Once the configuration information is obtained, the controller 102 proceeds to step 522 where it transmits the configuration information to the MCD 106 as described earlier.

As would be evident to an artisan with ordinary skill in the art, the foregoing embodiments of the present disclosure provide a variety of methods for conserving energy in an MCD 106, and for configuration and MCD 106 to enable communications with a WAP. It would be further apparent to said artisan that the methods disclosed can be applied to any combination of access technologies not just those presented herein.

It should also be noted that methods 300 and 500 can be modified in many ways within the scope and spirit of the claims described below. For instance, methods 300 and 500 can be modified so that the embodiments for location tracking of the MCD 106 relative to the WAPs are removed. Accordingly, the end user can direct the MCD 106 to scan a WAP when desired or at all times. When a WAP is detected and it does not provide its configuration information and/or the MCD 106 is not provisioned with the configuration information, MCD 106 can be programmed to automatically request the configuration information from the NMS 100 or when directed by the end user.

Figure 6:
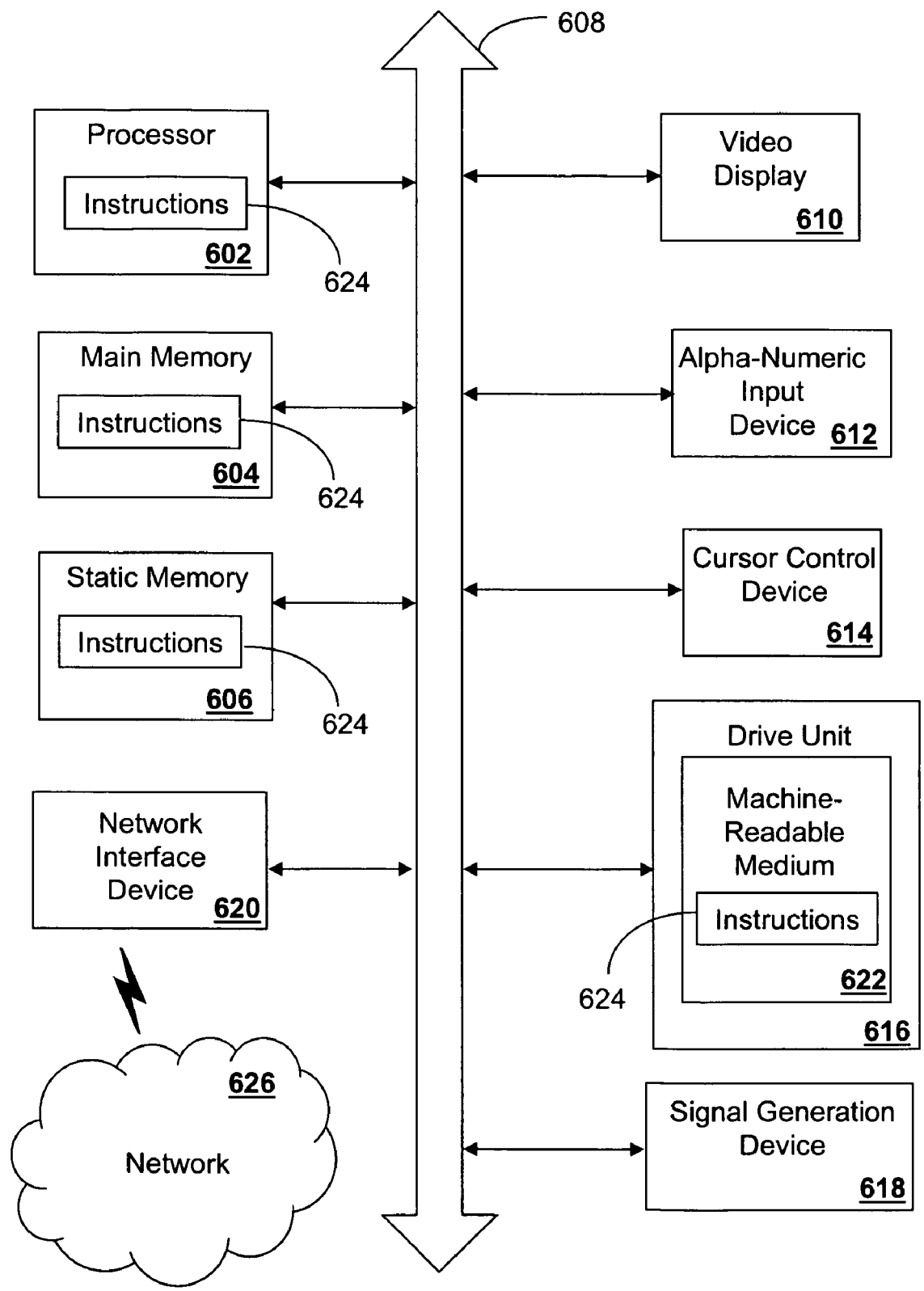
FIG. 6 is a diagrammatic representation of a machine in the form of a computer system within which a set of instructions, when executed, may cause the machine to perform any one or more of the methodologies discussed herein.

FIG. 6 is a diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A multimode communication device (MCD), comprising:
a controller for managing operations of a multimode wireless transceiver supporting communications on a plurality of wireless access technologies, wherein the controller is programmed to:
scan for a wireless access point over a first wireless access technology;
detect the wireless access point;
detect no broadcasting over the first wireless access technology of configuration information associated with the wireless access point;
transmit to a network management system (NMS) over a second wireless access technology a request for configuration information associated with the wireless access point;
receive the configuration information from the NMS, the configuration information being retrieved by the NMS directly from the wireless access point without centrally storing the configuration information; and
communicate with the wireless access point over the first wireless access technology according to the configuration information.

2. The MCD of claim 1, comprising a user interface (UI) for exchanging messages with the end user of the MCD, wherein the controller manages operations of the UI and is programmed to receive from the end user the request for configuration information associated with the wireless access point.

3. The MCD of claim 2, comprising a global positioning system (GPS) receiver, wherein the controller is programmed to:
conserve energy while the MCD is out of a communication range of the wireless access point;
monitor a location of the MCD;
transmit the location of the MCD to a network management system (NMS);
receive an indication from the NMS that the MCD is near the wireless access point according to the location of the MCD;
enable scanning in response to said indication.

4. The MCD of claim 2, wherein the controller is programmed to:
conserve energy while the MCD is out of a communication range of the wireless access point;
receive an indication from an NMS that the MCD is near the wireless access point; and
enable scanning in response to said indication.

5. The MCD of claim 1, wherein the request comprises an identifier associated with the MCD for enabling the NMS to cross-reference the configuration information with said identifier.

6. The MCD of claim 1, wherein the configuration information comprises a service set identifier (SSID), and one or more encryption keys, and wherein the controller is programmed to transmit the SSID and one or more encryption keys to the wireless access point for enabling communications therewith.

7. The MCD of claim 1, wherein the configuration information is received over one among the second wireless access technology and a third wireless access technology, and wherein the second wireless access technology comprises a circuit-switched channel, and wherein the third wireless access technology comprises a packet-switched channel.

8. The MCD of claim 1, wherein the configuration information is received in a short message system (SMS) message, and wherein the controller is programmed to retrieve the configuration information from the SMS message.

9. The MCD of claim 1, comprising a global positioning system (GPS) receiver, wherein the controller is programmed to include a location of the MCD in the request for enabling the NMS to identify the wireless access point and its corresponding configuration information.

10. The MCD of claim 1, wherein the controller is programmed to transmit to the NMS over the second wireless access technology subsequent requests for configuration information associated with other wireless access points, each of the subsequent requests being in response to a prompt by the MCD provided to an end user of the MCD.

11. A network management system (NMS), comprising:
a controller for managing operations of a communications interface for exchanging messages with multimode communication devices (MCDs) capable of accessing a plurality of wireless access technologies, wherein the controller is programmed to:
receive from an MCD over a first wireless access technology a request for configuration information associated with a wireless access point;
monitor a location of the MCD;
transmit a vicinity indication to the MCD when it is near the wireless access point for enabling in the MCD a process for scanning said wireless access point over a second wireless access technology;
obtain the configuration information associated with the wireless access point according to the request directly from the wireless access point and without accessing the configuration information from a central storage location not located at the access point; and
transmit the configuration information to the MCD using a WiFi or Bluetooth access technology.

12. The NMS of claim 11, comprising a memory, wherein the controller manages the memory and is programmed to:
retrieve from the request an identifier associated with the MCD and the wireless access point; and
retrieve from the memory the configuration information according to the identifier.

13. The NMS of claim 11, comprising a memory, wherein the controller manages the memory and is programmed to:
retrieve from the request an identifier associated with the MCD and the wireless access point;
retrieve from the memory according to the identifier an address associated with the wireless access point; and
obtain the configuration information from the wireless access point according to the address.

14. The NMS of claim 11, comprising a memory, wherein the controller manages the memory and is programmed to:
retrieve from the request the location of the MCD;
search in the memory for the wireless access point according to the location of the MCD; and
retrieve from the memory the configuration information associated with the wireless access point.

15. The NMS of claim 11, comprising a memory, wherein the controller manages the memory and is programmed to:
retrieve from the request the location of the MCD;
search in the memory for the wireless access point according to the location of the MCD;
retrieve from the memory an address associated with the wireless access point; and
obtain the configuration information from the wireless access point according to the address.

16. The NMS of claim 11, wherein the request is in response to a prompt provided to an end user of the MCD and wherein the controller is programmed to receive over the second wireless access technology subsequent requests for configuration information associated with other wireless access points, each of the subsequent requests being in response to a prompt by the MCD provided to an end user of the MCD.

17. The NMS of claim 11, wherein the controller is programmed to:
Receive from the MCD the location.

18. The NMS of claim 11, wherein the controller is programmed to transmit the configuration information to the MCD in an SMS message.

19. A computer-readable storage medium encoded with computer executable instructions operating in a multimode communication device (MCD), the computer instructions for:
scanning for a wireless access point using a first wireless access technology;
disabling the scanning when a signal associated with the wireless access point is below a threshold;
transmitting over a second wireless access technology a request for configuration information associated with the wireless access point from a network management system (NMS);
communicating over the first wireless access technology with the wireless access point according to the configuration information received from the NMS, wherein the configuration information associated with the wireless access point is transmitted directly from the wireless access point to the NMS and then transmitted over the second wireless access technology from the NMS to the MCD without the configuration information being stored centrally by the NMD; and
transmitting to the NMS over the second wireless access technology subsequent requests for configuration information associated with other wireless access points.

20. A computer-readable storage medium encoded with computer executable instructions operating in a network management system, the computer instructions for:
obtaining configuration information associated with a wireless access point in response to a request received from a multimode communication device (MCD) over a first wireless access technology, wherein the request is based on a response by an end user to a prompt by the MCD, wherein the configuration information is transmitted directly from the wireless access point to the NMS and then transmitted over the second wireless access technology from the NMS to the MCD without the configuration information being stored centrally by the NMD;
transmitting the configuration information to the MCD; and
receiving at the NMS subsequent requests for configuration information associated with other wireless access points, each of the subsequent requests being in response to a prompt by the MCD provided to an end user of the MCD.

* * * * *